Oct. 7, 1941.   A. H. HABERSTUMP   2,257,951
AUTOMOBILE BODY
Filed May 31, 1938
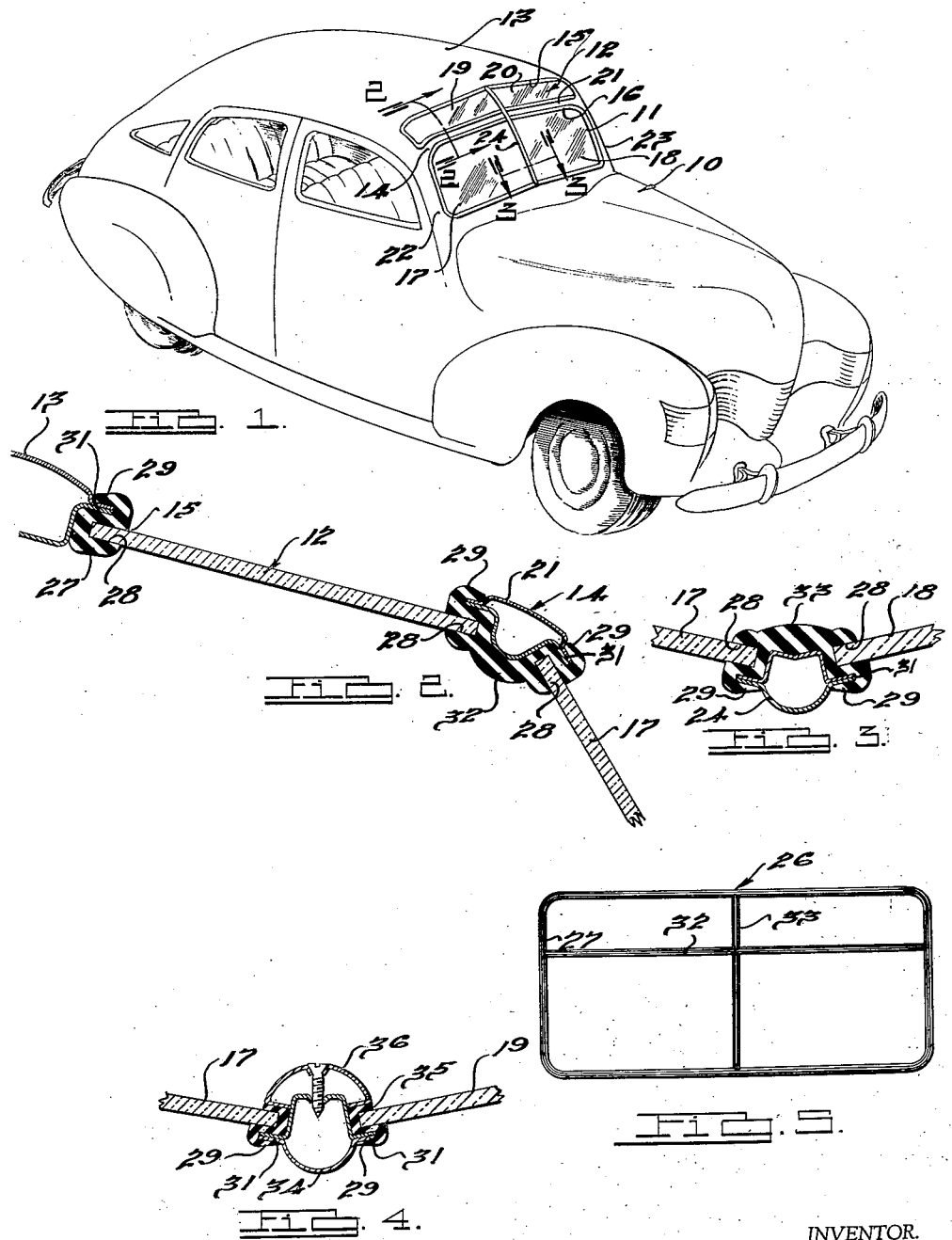
INVENTOR.
ALFRED H. HABERSTUMP
BY Harness, Dickey & Pierce
ATTORNEYS.

Patented Oct. 7, 1941

2,257,951

UNITED STATES PATENT OFFICE 2,257,951

AUTOMOBILE BODY

Alfred H. Haberstump, Detroit, Mich., assignor to The Murray Corporation of America, Detroit, Mich., a corporation of Delaware Application May 31, 1938, Serial No. 210,843

7 Claims. (Cl. 296—84)

My invention relates to vehicle bodies, and particularly to a vehicle body having a window above the windshield in the forward portion of the roof.

In view of the modern trend of lowering the bodies and sloping the front windshields at a material angle, the vision of the driver and other occupants of the vehicle have been restricted in vertical height to a material degree. With the advent of the ball-headed or rounded roof structure, and the all-metal construction, the added bracing elements employed at the forward edge, or header of the body, is no longer required. As a result, the present trend in vehicle body construction lends itself readily to the adaptation of the inventive concept of the present application in providing increased overhead vision for the vehicle occupants.

The front header portion and sloping pillars of the vehicle body may form an extended longitudinal opening in which one or a plurality of glass panes may be supported to provide forward and overhead vision. Bracing elements may extend laterally and vertically across the opening dividing the opening in two, four, or more areas in which the glass panes may be disposed. Such interconnecting bars may be a unit part of the body or may be strips which are bolted, welded, or otherwise secured thereto or to the glass sealing element. Rubber sealing elements which receive the marginal edge of the glass and the metal defining the opening, secures the glass to the metal edge and forms a water-tight seal. Rubber strips of the shape of the opening and the window panes may be employed which are braced by elements secured directly to the rubber strips at desired points following the teaching of the Haberstump Patent No. 2,082,830, issued June 8, 1937, and assigned to the assignee of the present invention.

Accordingly, the main objects of my invention are: to provide a window above the windshield of an automotive vehicle; to provide a window in the forward portion of the roof panel above the windshield; to form the front portion of the roof of an automotive vehicle with an opening in extension of the pillar defining the windshield opening and providing a brace separating the window from the windshield and mounting a window in said opening; to provide an opening between the pillars of the vehicle which extends upwardly into the front portion of the vehicle roof and mounting transparent elements therein to increase the upward vision of the vehicle occupants; to mount a plurality of window panes in the front portion of a vehicle body which are interconnected and sealed to the metal elements defining the openings by rubber receiving and sealing strips; to provide a sealing strip of rubber which engages the marginal edge of a plurality of openings provided in the front top portion of the vehicle and the window panes which enclose the openings to support and seal the window panes therein; and in general, to provide a plurality of window panes for the top front portion of a vehicle body which increases the vision of the occupants, provides additional light to the interior of the vehicle, and which is positively sealed to the marginal edges defining said opening or openings.

Other objects and features of novelty of my invention will be either specifically pointed out or will become apparent when referring, for a better understanding of my invention, to the following description taken in conjunction with the accompanying drawing, wherein:

Figure 1 is a perspective view of a vehicle body, embodying features of my invention;

Fig. 2 is an enlarged broken sectional view of structure illustrated in Fig. 1, taken on the line 2—2 thereof;

Fig. 3 is an enlarged sectional view of structure illustrated in Fig. 1, taken on the line 3—3 thereof;

Fig. 4 is a view of structure, similar to that illustrated in Fig. 3, showing a modified form thereof; and Fig. 5 is a view in elevation of the sealing strip employed on the body illustrated in Fig. 1.

The automobile 10 illustrated in Fig. 1 is of the conventional type with the exception that the windshield 11 and the roof window 12 is of new and novel construction. The roof 13 terminates rearwardly of the header bar 14 providing an opening 15 rearwardly of the windshield. The bar 14 may in some constructions be omitted, leaving the windshield opening 16 continuous with the opening 15. Window panes 17, 18, 19, and 20 form the windshield and the roof window when suspended in the opening. When the openings 15 and 16 are separated by the header bar 14, such bar may be part of the vehicle body and may be formed in the roof panel, or may be a separate element welded or otherwise secured to the front pillars 22 and 23. A central vertical bar 24 may likewise be a portion of the body stamping, forming a unit with the cowl and roof panel and also the header bar 21. Such a vertical element 24 is omitted when a unit windshield panel and a unit window panel are employed. Further, such vertical central bar 24 may constitute a removable element which is attached to and supported by the sealing element for the windshield as illustrated and described in my co-pending application, Serial No. 35,427, filed August 9, 1935, and assigned to the assignee of the present invention.

The teaching of the application may be extended to apply to the present construction. That is to say, the unit rubber sealing and supporting strip of the application may be enlarged to also embrace the window panes 19 and 20 for the roof windows. When so employed, the header bar 21 and vertical dividing bar 24 may be supported by such a unit rubber strip 26 which is illustrated in Fig. 5.

The strip 26 has an outer border portion 27 which is provided with a slot 28 as illustrated in Fig. 2 in which the glass 12 is supported. An outer lip 29 extends over the terminal end 31 of the roof 13 and the side edges 31 of the pillars and the cowl panel to seal and support the glass panes thereto. Laterally spanning the vertical border portions 27 of the strip 26, a longitudinal portion 32 is provided having lip portions 28 therein, one for receiving an edge of the roof window panes 19 and 20, the other for receiving the windshield window panes 17 and 18. The strip 32 is also provided with lips 29 for receiving the edges 31 of the header bar 14 which, as pointed out hereinabove, may be a unit element with the body or a separate trim and bracing element supported by the rubber sealing portion 32.

Spanning the opposite vertical border portions 27 of the rubber sealing strip 26 illustrated in Fig. 5 and joined to the laterally disposed strip 32 in the plane thereof, I have provided a vertically extending rubber sealing strip 33 illustrated in section in Fig. 3. This strip is similar to the strip 32, having recesses 28 for receiving an edge of the panes 17, 18, 19, and 20, and having outer lips 29 which receive the edges 31 of the bracing strip 24 described above. The strip 24 may be suspended entirely by the rubber strip and may be connected to and made part of the horizontal separate strip 21. The strip 24, as pointed out above may be a portion of the body stamping for supporting the rubber sealing strip 33.

When the header bar and vertical element 24 are formed as part of the body the sealing strips may be separate elements, one for each window pane. In Fig. 4, I have illustrated a bar 34 which may be stamped with the body panel or made separately and welded, brazed, or otherwise secured thereto to constitute a hollow box section structure having projecting flanges 31. A rubber sealing strip 35 surrounds each of the window panes 17, 18, 19, and 20 having lip portions 29 which extend over the flanges 31 to seal the panes thereto. A garnish molding 36 is removably attached to the inner side of the header bar and the vertical supporting bar 34 to assist in retaining the rubber sealing element in position and to finish the inner surface of the bars.

In any of the arrangements above described, the body is formed having a roof window juxta disposed to the windshield to increase the upper vision of the vehicle occupants. A single windshield and a single roof panel may be employed, disposed in a unit opening in the body supported and sealed by a unit strip which will support the finish and brace molding, or which may be separate sealing strips which are sealed to the marginal edges of the two openings formed in the body. Pairs of windshield and roof panels may also be utilized, sealed and supported by a unit rubber element, as illustrated in Fig. 5, which also supports the trim and brace bars disposed therebetween. Separate sealing strips may also be employed for each unit window pane, engaging the marginal edge of each individual opening formed in the body. Garnish molding may be employed on the inner side of the body for retaining the rubber sealing elements and the window panes in position and for finishing the inner surface of the strips.

While I have described and illustrated several embodiments of my invention, it will be apparent to those skilled in the art that various changes, omissions, additions, and substitutions may be made therein without departing from the spirit and scope of my invention, as set forth in the accompanying claims.

What I claim is:

1. In a vehicle body, a roof panel and pillars sloping forwardly to the cowl of the body and having an opening therein, a windshield above said cowl, a roof window above said windshield, a metal strip forming a unit part of the body between said windshield and roof window, and a unit sealing strip attaching said window and windshield to said metal strip.

2. A vehicle body having a roof and pillars sloping forwardly to the cowl providing an opening, a cross-shaped member of narrow width dividing said opening into four smaller openings, a plurality of windows one for each compartment of said opening, said windows being disposed laterally of each other and above each other, and unit means for sealing said windows to the elements defining the marginal edge thereof.

3. A vehicle body having a roof and pillars sloping forwardly to the cowl providing an opening, a header bar dividing said opening, a vertical bar dividing said divided opening forming four compartments, a plurality of windows one for each compartment of said opening, said windows being disposed laterally of each other and above each other, unit means for sealing said windows to the elements defining the marginal edge thereof and spanning said bars.

4. A vehicle body having a roof, pillars, and cowl defining an opening, a pair of windows in the lower portion of the opening, a pair of windows above said first windows disposed in the upper portion of the opening, a header bar between said upper and lower windows and a unit sealing element surrounding said windows and engaging the marginal edges of the pillars, roof, and cowl and spanning said header bar.

5. A vehicle body having a roof, pillars, and cowl defining an opening, a pair of windows in the lower portion of the opening, a pair of windows above said first windows disposed in the upper portion of the opening, a unit sealing element surrounding said windows and engaging the marginal edges of the pillars, roof, and cowl, and metal strips secured to said sealing means both laterally and vertically of said opening.

6. A vehicle body having a roof, pillars, and a cowl defining an opening, a unit cross-shaped element integral with the roof, cowl and pillars dividing said opening into a plurality of smaller openings forwardly of the body header, a window for each said opening, and sealing means individual to each window for securing said window to the marginal edge of said smaller openings.

7. A vehicle body having an opening defined by a pillar and cowl intersected by a header bar of narrow width, a windshield for said opening below said bar, a window for said opening above said bar, and a unit strip spanning said bar and sealing the edges of the windshield and window.

ALFRED H. HABERSTUMP.